United States Patent
Kato et al.

(10) Patent No.: US 9,950,945 B2
(45) Date of Patent: Apr. 24, 2018

(54) TEMPERED GLASS SHEET

(71) Applicant: Asahi Glass Company, Limited, Chiyoda-ku (JP)

(72) Inventors: Yasumasa Kato, Chiyoda-ku (JP); Kazushige Yoda, Chiyoda-ku (JP); Jiro Nishihama, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/189,543

(22) Filed: Jun. 22, 2016

(65) Prior Publication Data

US 2017/0001899 A1    Jan. 5, 2017

(30) Foreign Application Priority Data

Jul. 1, 2015  (JP) .................................. 2015-132348

(51) Int. Cl.
*C03B 27/04*  (2006.01)
*C03B 27/052*  (2006.01)
*C03C 23/00*  (2006.01)

(52) U.S. Cl.
CPC ...... *C03B 27/0526* (2013.01); *C03B 27/0522* (2013.01); *C03C 23/007* (2013.01)

(58) Field of Classification Search
CPC .. C03B 27/0526; C03B 5/0522; C03C 23/007
See application file for complete search history.

(56) References Cited

U.S. PATENT DOCUMENTS

2005/0250639 A1* 11/2005 Siebers .................. C03C 3/083
                                                              501/68
2006/0257668 A1* 11/2006 Frommelt ......... B32B 17/10045
                                                              428/428

FOREIGN PATENT DOCUMENTS

JP          9-183626          7/1997

OTHER PUBLICATIONS

James Shelby, Introduction to Glass Science and Technology, 2005, Royal Society of Chemistry, pp. 195-196.*
Stijn De Pauw, Experimental and Numerical Study of Impact on Window Glass Fitted with Safety Window Film, 2010, Universiteit Gent, pp. 40-41.*

* cited by examiner

*Primary Examiner* — Maria V Ewald
*Assistant Examiner* — Zachary M Davis
(74) *Attorney, Agent, or Firm* — Oblon, McClelland, Maier & Neustadt, L.L.P.

(57) ABSTRACT

To provide a tempered glass sheet having a thickness of from 1.8 to less than 2.5 mm, which is capable of satisfying the fragmentation quality and impact strength quality required for windowpanes for automobiles. A tempered glass sheet having a first surface, a second surface opposed to the first surface and a side surface connecting the first and second surfaces, and having a thickness of from 1.8 to less than 2.5 mm, wherein at the first surface, the average value of the surface compressive stress is within a range of from 100 to 160 MPa, and the average value of the surface strength is within a range of from 220 to 400 MPa.

20 Claims, 8 Drawing Sheets

| | Example 1 | Example 2 | Example 3 | Example 4 |
|---|---|---|---|---|
| Sheet thickness | 1.8 mm | 2.0 mm | 2.0 mm | 2.0 mm |
| Nozzle pattern | Φ4.6-30×50 | Φ4.6-30×50 | Φ4.6-30×50 | Φ3.4-13×20 |
| Distance between nozzles' forward end and glass | 30 mm | 30 mm | 25 mm | 15 mm |
| Maximum wind pressure | 200 kPa | 200 kPa | 200 kPa | 38 kPa |
| Quenching time | 3s | 3s | 3s | 5s |
| Glass heating temperature | 685°C | 685°C | 685°C | 690°C |
| Surface compressive stress evaluation number | 4 sheets × 2 points × 2 directions | 2 sheets × 2 points × 2 directions | 2 sheets × 2 points × 2 directions | 2 sheets × 2 points × 2 directions |
| Average surface compressive stress (MPa) | 120.9 MPa | 142.1 MPa | 145.9 MPa | 122.2 MPa |
| Minimum surface compressive stress (MPa) | 97.5 MPa | 119.1 MPa | 116.6 MPa | 111.0 MPa |
| Surface strength evaluation number | B surface strength 21 sheets | B surface strength 21 sheets | B surface strength 21 sheets | B surface strength 21 sheets |
| Average surface strength (MPa) | 279.6 MPa | 261.8 MPa | 279.5 MPa | 276.7 MPa |
| Minimum surface strength (MPa) | 226.6 MPa | 190.7 MPa | 206.7 MPa | 216.5 MPa |
| Weibull modulus (dimensionless) | 9.9658 | 7.8207 | 9.8425 | 11.177 |
| Number of non-fractured sheets by ball drop test 2 m | 6 sheets among 6 sheets | 5 sheets among 6 sheets | 5 sheets among 6 sheets | 12 sheets among 12 sheets |

| | Example 5 | Comparative Example 1 | Comparative Example 2 |
|---|---|---|---|
| Sheet thickness | 2.3 mm | 2.0 mm | 2.3 mm |
| Nozzle pattern | Φ3.4-13×20 | Φ3.4-13×20 | Φ7.5-25×43 |
| Distance between nozzles' forward end and glass | 15 mm | 15 mm | 35 mm |
| Maximum wind pressure | 24 kPa | 42 kPa | 35 kPa |
| Quenching time | 5s | 5s | 10s |
| Glass heating temperature | 685°C | 685°C | 685°C |
| Surface compressive stress evaluation number | 2 sheets × 2 points × 2 directions | 2 sheets × 2 points × 2 directions | 4 sheets × 2 points × 2 directions |
| Average surface compressive stress (MPa) | 113.9 MPa | 99.6 MPa | 99.25 MPa |
| Minimum surface compressive stress (MPa) | 101.4 MPa | 79.0 MPa | 96 MPa |
| Surface strength evaluation number | B surface strength 23 sheets | B surface strength 22 sheets | Not conducted |
| Average surface strength (MPa) | 343.6 MPa | 218.5 MPa | Not conducted |
| Minimum surface strength (MPa) | 274.1 MPa | 168.3 MPa | Not conducted |
| Weibull modulus (dimensionless) | 10.636 | 9.9141 | Not conducted |
| Number of non-fractured sheets by ball drop test 2 m | 6 sheets among 6 sheets | 3 sheets among 6 sheets | Not conducted |

(a) Example 1

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| 1-1 | ○ | ○ | ○ | × | | | | | |
| 1-2 | ○ | ○ | ○ | × | | | | | |
| 1-3 | ○ | × | | | | | | | |
| 1-4 | ○ | × | | | | | | | |
| 1-5 | ○ | ○ | × | | | | | | |
| 1-6 | ○ | × | | | | | | | |

(b) Example 2

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| 2-1 | ○ | ○ | ○ | ○ | ○ | ○ | ○ | ○ | × |
| 2-2 | ○ | ○ | ○ | ○ | ○ | × | | | |
| 2-3 | ○ | ○ | × | | | | | | |
| 2-4 | ○ | ○ | ○ | ○ | ○ | ○ | ○ | ○ | ○ |
| 2-5 | ○ | ○ | ○ | ○ | ○ | ○ | ○ | × | |

(c) Example 3

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| 3-1 | ○ | ○ | ○ | ○ | × | | | | |
| 3-2 | ○ | ○ | ○ | ○ | ○ | × | | | |
| 3-3 | ○ | ○ | ○ | × | | | | | |
| 3-4 | ○ | ○ | ○ | ○ | ○ | ○ | ○ | × | |
| 3-5 | ○ | ○ | × | | | | | | |

(d) Example 4

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| 4-1 | ○ | ○ | ○ | ○ | ○ | × | | | |
| 4-2 | ○ | ○ | ○ | ○ | ○ | ○ | ○ | ○ | ○ |
| 4-3 | ○ | ○ | ○ | ○ | ○ | × | | | |
| 4-4 | ○ | ○ | ○ | ○ | ○ | ○ | ○ | ○ | ○ |
| 4-5 | ○ | ○ | ○ | ○ | ○ | ○ | ○ | ○ | ○ |
| 4-6 | ○ | ○ | × | | | | | | |
| 4-7 | ○ | ○ | ○ | ○ | ○ | ○ | × | | |
| 4-8 | ○ | ○ | ○ | ○ | ○ | × | | | |
| 4-9 | ○ | ○ | ○ | ○ | ○ | ○ | ○ | × | |
| 4-10 | ○ | ○ | ○ | ○ | ○ | × | | | |
| 4-11 | ○ | × | | | | | | | |
| 4-12 | ○ | ○ | ○ | ○ | × | | | | |

(e) Example 5

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| 5-1 | ○ | ○ | ○ | ○ | ○ | ○ | ○ | ○ | ○ |
| 5-2 | ○ | ○ | ○ | ○ | ○ | ○ | × | | |
| 5-3 | ○ | ○ | ○ | ○ | ○ | ○ | ○ | ○ | × |
| 5-4 | ○ | ○ | ○ | ○ | ○ | ○ | ○ | × | |
| 5-5 | ○ | ○ | ○ | ○ | ○ | ○ | ○ | ○ | ○ |
| 5-6 | ○ | ○ | ○ | ○ | ○ | ○ | ○ | ○ | ○ |

(f) Comparative Example 1

|  | 2.0 m | 2.5 m | 3.0 m | 3.5 m | 4.0 m | 4.5 m | 5.0 m | 5.5 m | 6.0 m |
|---|---|---|---|---|---|---|---|---|---|
| Comparative-1 | ○ | ○ | × | | | | | | |
| Comparative-2 | ○ | ○ | ○ | × | | | | | |
| Comparative-3 | ○ | ○ | × | | | | | | |
| Comparative-4 | × | | | | | | | | |
| Comparative-5 | × | | | | | | | | |
| Comparative-6 | × | | | | | | | | |

Fig. 7

TEMPERED GLASS SHEET

TECHNICAL FIELD

The present invention relates to a tempered glass sheet, particularly to a tempered glass sheet having a thickness of from 1.8 to less than 2.5 mm.

BACKGROUND ART

Tempered glass sheets have been used as windowpanes (particularly as side windowpanes or rear windowpanes) for automobiles. A tempered glass sheet has compressive stress layers at its surfaces (at a first surface and a second surface) and a tensile stress layer at a center portion in its thickness direction. Such a tempered glass sheet can be produced by applying tempering treatment by blowing air to the surfaces of a glass sheet in a high temperature state of from 650 to 700° C.

In recent years, from the viewpoint of environmental problems, in order to save the costs for fuels, reduction of the weight of automobiles has been strongly demanded, and reduction of the weight of the windowpanes for automobiles, as automobile parts, has been desired.

Patent Document 1 discloses a tempered glass which is an air-quench tempered glass sheet having a thickness of from 2.5 to 3.1 mm and which satisfies that in the fragmentation test (JIS R3212: 2008) in a size of 50×50 mm, as stipulated in Safety Standards for Automotive glass, the number of fragments is at least 40 pieces (hereinafter referred to also as the fragmentation quality) and that in the impact strength test (JIS R3212: 2008) to be judged by a height for breakage by dropping a steel ball of 227 g, the height is at least 2 m (hereinafter referred to also as the impact strength quality).

PRIOR ART DOCUMENT

Patent Document

Patent Document 1: JP-A-9-183626

DISCLOSURE OF INVENTION

Technical Problem

However, the tempered glass sheet as disclosed in Patent Document 1 is thick and thus is not one to satisfy the demand for weight reduction of automobiles, and it still does not realize a tempered glass sheet that satisfies both of the fragmentation quality and the impact strength quality, and yet is thin in its thickness.

The present invention has been made under these circumstances, and it is an object of the present invention to provide a tempered glass sheet having a thickness of from 1.8 to less than 2.5 mm, which is capable of satisfying both of the fragmentation quality and the impact strength quality that are required for windowpanes for automobiles.

Solution to Problem

In order to accomplish the object of the present invention, one embodiment of the present invention provides a tempered glass sheet having a first surface, a second surface opposed to the first surface and a side surface connecting the first and second surfaces, and having a thickness of from 1.8 to less than 2.5 mm, wherein at the first surface, the average value of the surface compressive stress is within a range of from 100 to 160 MPa, and the average value of the surface strength is within a range of from 220 to 400 MPa.

Advantageous Effects of Invention

According to the one embodiment of the present invention, a tempered glass sheet is provided which has a thickness of from 1.8 to less than 2.5 mm and which is capable of satisfying both of the fragmentation quality and the impact strength quality that are required for windowpanes for automobiles.

BRIEF DESCRIPTION OF DRAWINGS

FIG. 2 is a list showing the characteristics of tempered glass sheets in Examples 1 to 5 and Comparative Examples 1 and 2 prepared by the air-quench tempering apparatus, and the specifications for the air-quench tempering apparatus at the time of preparing such tempered glass sheets.

DESCRIPTION OF EMBODIMENT

Now, a preferred embodiment of the tempered glass sheet according to the present invention will be described with reference to the accompanying drawings.

The tempered glass sheet in this embodiment has a first surface, a second surface opposed to the first surface, and a side surface connecting the first and second surfaces. In this embodiment, the first surface is meant for the lower surface (hereinafter referred to also as the bottom (B) surface) which was in contact with molten metal such as molten tin pooled in a float glass bath, in a glass sheet prepared by a float process, and the second surface is meant for the upper surface (hereinafter referred to also as the top (T) surface) opposed to the lower surface, which was in contact with the atmosphere. Here, when the surface states of the first and second surfaces are compared, the first surface which was in contact with a molten metal, is roughened as compared with the second surface which was in contact with the atmosphere, as the liquid surface of the molten metal is transferred to the first surface, and thus in many cases, the first surface is lower in strength than the second surface. That is, at the second surface, the average value of the surface compressive stress is at least the average value of the surface compressive stress at the first surface, and also, the average value of the surface strength is at least the average value of the surface strength at the first surface. In such a case, the properties of the first surface will be dominant over the impact strength quality of the glass sheet.

In a case where glass is prepared by a method (such as a fusion method) other than the above process, there will be no difference between the B surface and the T surface, and therefore, either surface may be regarded as the first surface. Further, also in a case where the B surface of glass prepared by the float process has been polished, there will be no difference between the B surface and the T surface, and therefore, either surface may be regarded as the first surface.

Further, the thickness of the tempered glass sheet in this embodiment is from 1.8 to less than 2.5 mm, but from the viewpoint of weight reduction of automobiles, the sheet thickness is preferably at most 2.3 mm. Here, when the sheet thickness is at least 1.8 mm, it is possible to form a surface compressive stress satisfying the fragmentation quality and an internal tensile stress forming together with the surface compressive stress, in the air-quench tempering method.

Further, at the first surface of the tempered glass sheet in this embodiment, the average value of the surface compressive stress is within a range of from 100 to 160 MPa, more preferably from 105 to 155 MPa, further preferably from 110 to 150 MPa.

By adjusting the average value of the surface compressive stress to be within such a range, if the tempered glass sheet is fractured, cracks will be branched and it becomes easy to let fine fragments be formed, and it becomes easy to satisfy the desired fragmentation quality.

Further, at the first surface of the tempered glass sheet in this embodiment, the minimum value of the surface compressive stress is at least 80 MPa, preferably at least 85 MPa, more preferably at least 90 MPa, further preferably at least 95 MPa.

By adjusting the minimum value of the surface compressive stress to be such a level, it becomes possible to obtain a high internal tensile stress, whereby if the tempered glass sheet is fractured, cracks will be branched and it becomes easy to let fine fragments be formed, and it becomes easy to satisfy the desired fragmentation quality.

Further, in the tempered glass sheet in this embodiment, the average value of the surface strength is within a range of from 220 to 400 MPa, preferably from 230 to 390 MPa, more preferably from 250 to 380 MPa.

By adjusting the average value of the surface strength to be within such a range, it becomes possible to prevent formation or propagation of cracks to break the tempered glass sheet, even if a tensile stress is formed in the tempered glass sheet by dropping of a steel ball at the time of an impact strength test, and it becomes easy to satisfy the desired impact strength quality.

Further, in the tempered glass sheet in this embodiment, the minimum value of the surface strength is at least 170 MPa, preferably at least 180 MPa, more preferably at least 190 MPa.

By adjusting the minimum value of the surface strength to be such a level, it becomes possible to prevent formation or propagation of cracks to break the tempered glass sheet, even if a tensile stress is formed in the tempered glass sheet by dropping of a steel ball at the time of an impact strength test, and it becomes easy to satisfy the desired impact strength quality.

Further, by adjusting the average value of the surface strength to be within the above range and also adjusting the minimum value of the surface strength to be within the above range, the impact strength quality will be further stabilized.

Further, the tempered glass sheet in this embodiment has a Weibull modulus of preferably at least 7.5, more preferably at least 8.0, further preferably at least 8.5. It is thereby possible to suppress fluctuation in the surface strength to be small, whereby the impact strength quality will be stabilized.

Figure 1A:
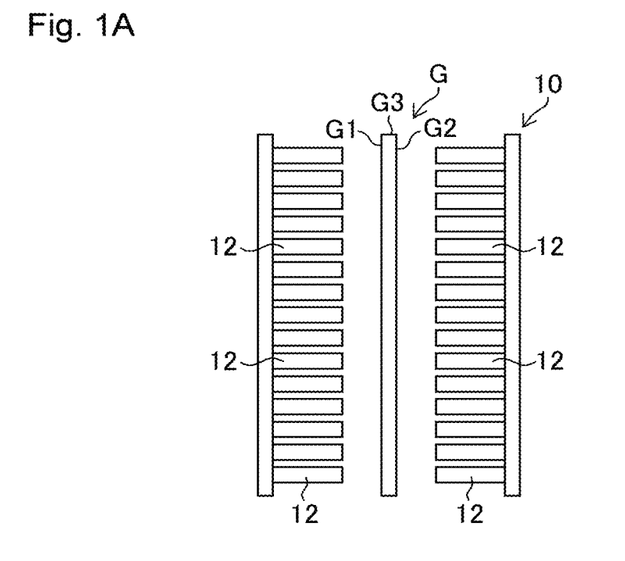
FIG. 1A is an enlarged side view of a main part of the air-quench tempering apparatus in one embodiment of the present invention.
Figure 1B:
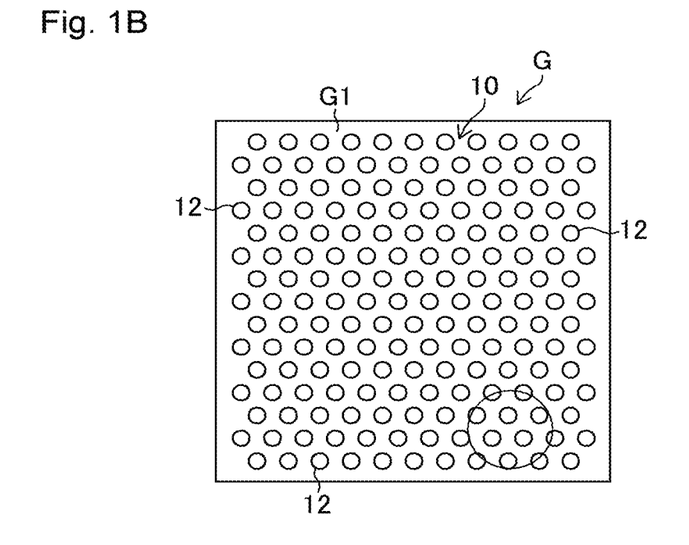
FIG. 1B is a front view of the air-quench tempering apparatus shown in FIG. 1A.

FIG. 1A is a side view of a main part of the air-quench tempering apparatus 10; FIG. 1B is a front view of the air-quench tempering apparatus 10; and FIG. 1C is an enlarged front view of a main part of the air-quench tempering apparatus 10.

A glass sheet G prior to tempering treatment to be treated for tempering by an air-quench tempering apparatus 10, is a glass sheet G having a first surface G1, a second surface G2 opposed to the first surface G1, and a side surface G3 connecting the first surface G1 and the second surface G2, and having a thickness of from 1.8 to less than 2.5 mm. The air-quench tempering apparatus 10 is provided with a plurality of nozzles 12 to blow air towards the entire areas of the first surface G1 and the second surface G2. The pressure loss of the nozzles 12 should better be as small as possible.

Figure 1C:
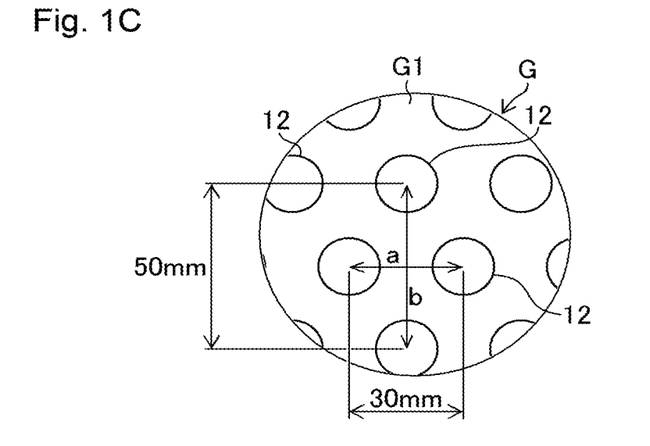
FIG. 1C is an enlarged front view of a main part of the air-quench tempering apparatus shown in FIG. 1A.

By means of the apparatus as shown in FIGS. 1A to 1C, the tempered glass sheet in this embodiment can be prepared by adjusting the nozzle pattern, the distance between the nozzles' forward ends and the glass, the air pressure, the quenching time and the glass heating temperature as in the following Examples, although the details will be described later.

EXAMPLES

FIG. 2 is a list showing the characteristics of tempered glass sheets in Examples 1 to 5 and Comparative Examples 1 and 2 prepared by the air-quench tempering apparatus 10, the specifications for the air-quench tempering apparatus 10 at the time of producing such tempered glass sheets, etc. In FIG. 2, the sheet thickness represents the thickness of a tempered glass sheet.

Further, φ for the nozzle pattern represents the nozzle diameter mm, and "30×50" means that in a diamond shape to be formed by connecting the centers of four adjacent nozzles 12 in the disposition pattern of nozzles 12 as shown in FIG. 1C, "30" represents the length mm of a short axis a, and "50" represents the length mm of a long axis b. Further, the wind pressure represents the maximum wind pressure of air blown from the nozzles 12, and the glass heating temperature represents the temperature of the glass sheet G in the heating furnace at the time of transporting the glass sheet G from the heating furnace to the air-quench tempering zone.

Further, the surface compressive stress is a value measured by a surface stress meter. Specifically, Babinet-type surface stress meter BTP-H manufactured by ORIHARA INDUSTRIAL CO., LTD. was used as the measuring equipment. Two points in the vicinity of the center of a tempered glass sheet (the gravity center of a triangle constituted by points impinged by jet flows from the nozzles 12) were used as the measuring points. The measuring directions of the stress were two directions i.e. vertical and horizontal directions.

The evaluation method for the fragmentation quality is such that by a fragmentation test in accordance with the method for testing safety glass for automobiles as stipulated in JIS R3212: 2008, the number of fragments is at least 40 pieces and at most 400 pieces, in a tempered glass sheet of a 50 mm×50 mm size.

Further, the surface strength is a value measured by a ring bending test (referred to also as a ring-on-ring test) for glass as stipulated in C1499-01 of ASTM Standards. Specifically, on a ring having a diameter of 260 mm, a tempered glass sheet was horizontally mounted with the first surface G1 being on the lower side, and a ring made of SUS304 with a diameter of 46 mm was permitted to descend at a rate of 10 mm per minute, to measure the fracture stress, and this operation was repeated from 21 to 23 times and the average value thereof was taken as the average value of surface strength.

Further, the Weibull modulus means an inclination obtained from a Weibull plot, prepared by plotting strength data on Weibull probability axes by the Weibull statistical analysis as stipulated in JIS 1625: 2010 (hereinafter referred to as "Weibull plot").

Further, the number of non-fractured sheets by ball drop test 2 m, represents the number of tempered glass sheets not fractured at the time of dropping a steel ball from a height of 2 m in accordance with the impact strength test (JIS R3212: 2008). Here, in safety standards, it is stipulated that a case where 5 sheets among 6 sheets are not fractured, is regarded as "pass".

Figure 3:
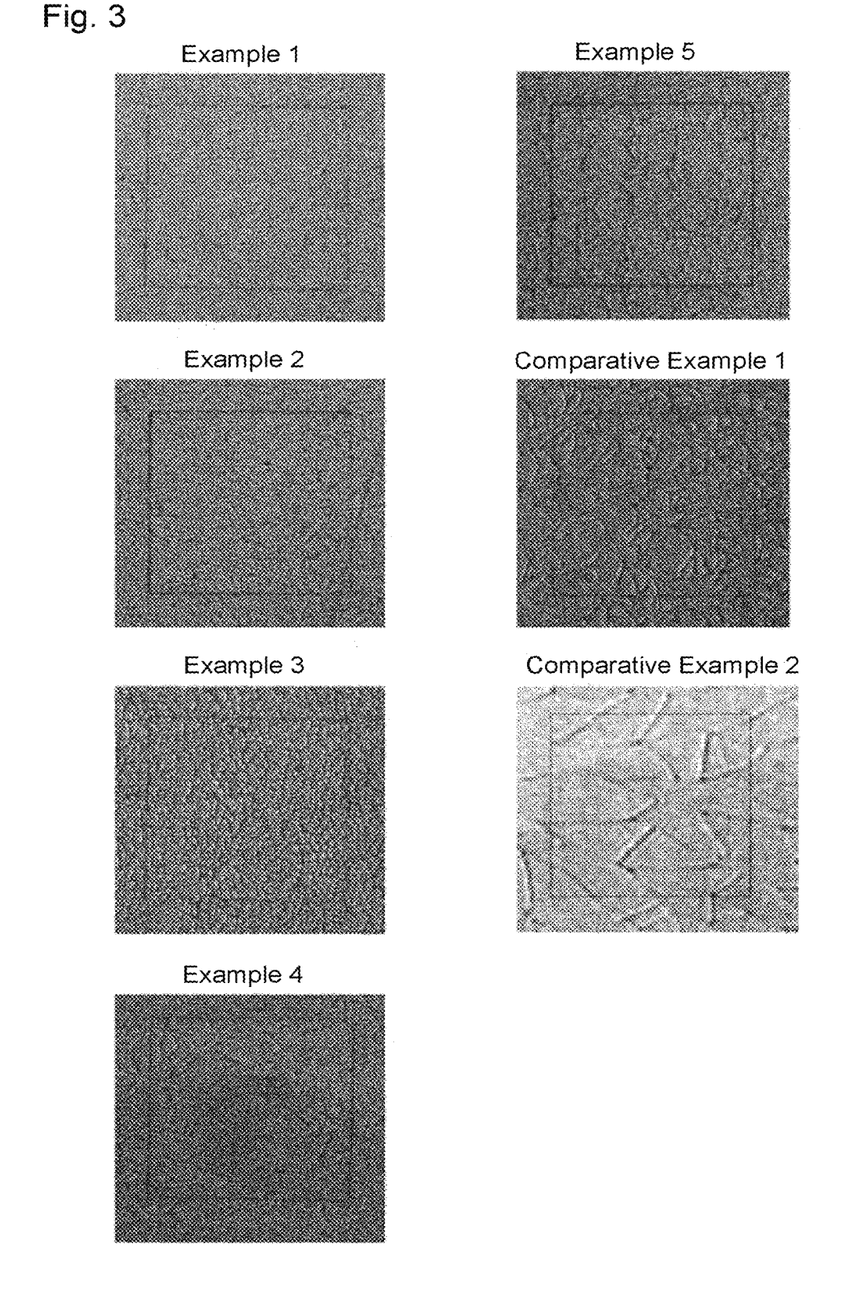
FIG. 3 is pattern diagrams showing the evaluation results of the fragmentation quality with respect to tempered glass sheets in Examples 1 to 5 and Comparative Examples 1 and 2.

FIG. 3 shows the results of evaluation of the fragmentation quality with respect to tempered glass sheets in Examples 1 to 5 and Comparative Examples 1 and 2. The square drawn in each photograph in FIG. 3 is a 5 cm square, and the number of fragments in this square is the target for evaluation of the fragmentation quality. From FIG. 3, Examples 1 to 5 have been found to satisfy the safety standards stipulated in JIS R3212: 2008. On the other hand, Comparative Example 1 has been found to be slightly inadequate in that while it satisfies the above safety standards, large fragments tend to be formed as compared with Examples 1 to 5. Further, Comparative Example 2 has been found not to satisfy the safety standards.

Thus, when the average value of the surface compressive stress is from 100 to 160 MPa, if the tempered glass sheet is fractured, cracks tend to be branched to easily form fine fragments, whereby it becomes easy to satisfy the desired fragmentation quality. Likewise, when the minimum value of the surface compressive stress is at least 80 MPa, it becomes easy to satisfy the desired fragmentation quality.

Figure 4:
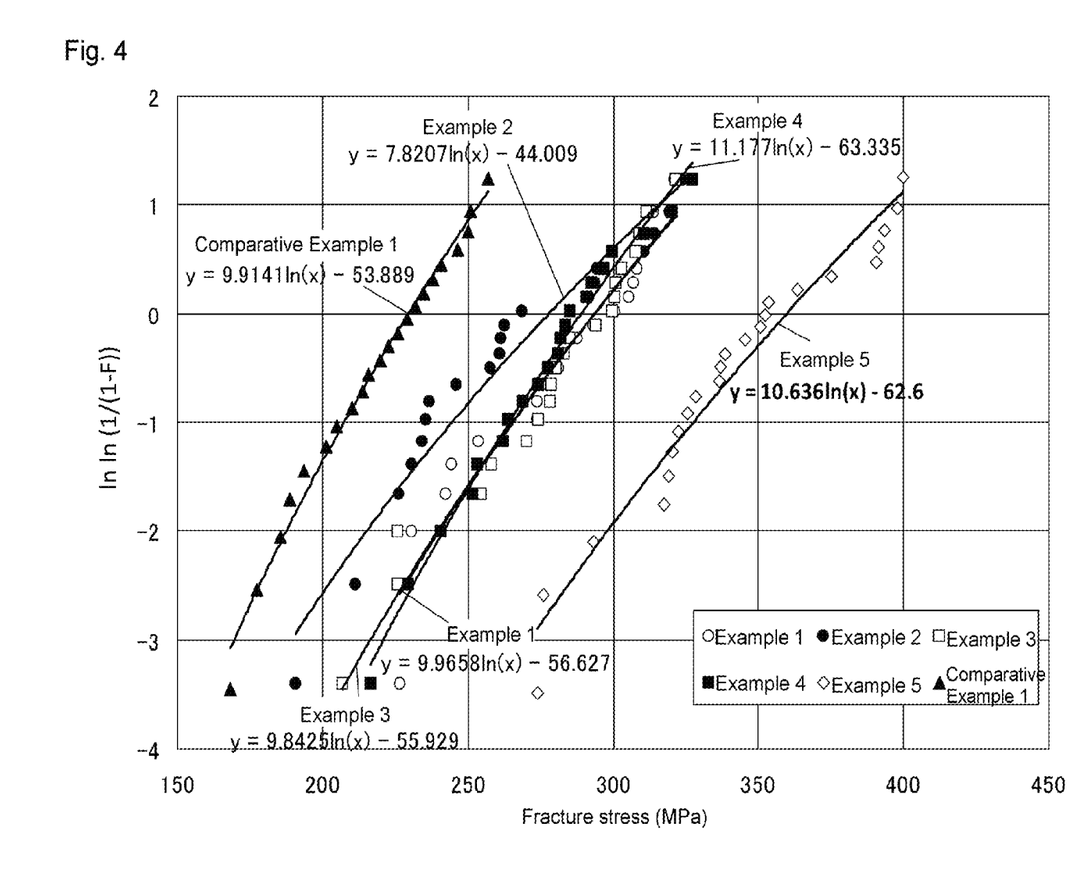
FIG. 4 is Weibull plots with respect to tempered glass sheets in Examples 1 to 5 and Comparative Example 1.

FIG. 4 shows Weibull plots with respect to tempered glass sheets in Examples 1 to 5 and Comparative Example 1. A Weibull plot is prepared by plotting strength data in a graph with the ordinate for $\ln(1-F)^{-1}$ and the abscissa for $\ln\sigma$, when the cumulative fracture probability is represented by F (%), and the strength is represented by σ (MPa). Here, ln is natural logarithm. As the plot is located closer to the right hand side in FIG. 4, the surface strength is larger, and as the inclination of the plot (the Weibull modulus) is larger, the fluctuation in the surface strength is smaller.

Further, in FIG. 4, the Weibull modulus y in Example 1 plotted with symbol ○ is about 9.96; the Weibull modulus y in Example 2 plotted with symbol ● is about 7.82; the Weibull modulus y in Example 3 plotted with symbol □ is about 9.84; the Weibull modulus y in Example 4 plotted with symbol ■ is about 11.17; the Weibull modulus y in Example 5 plotted with symbol ◇ is about 10.63; and the Weibull modulus y in Comparative Example 1 plotted with symbol ▲ is about 9.91.

When the Weibull modulus is at least 7.5, more preferably at least 8.0, further preferably at least 8.5, it is possible to suppress fluctuation in the surface strength to be small, whereby the impact strength quality is stabilized.

Further, in Comparative Examples, fluctuation in the surface strength was small, but the surface strength itself was so small that the desired impact strength quality was not satisfied.

Further, the ball drop test is an impact resistance test as a test method for safety glass for automobiles as stipulated in JIS R3212: 2008 and is one wherein the fractured state was confirmed when a steel ball having a diameter of 38 mm and a mass of 227±2 g was naturally dropped to a tempered glass sheet from a height of 2 m.

The evaluation method in the ball drop test was such that no fracture should be observed when the steel ball was naturally dropped from a height of 2 m to a tempered glass sheet with the first surface G1 located below.

Figure 5:
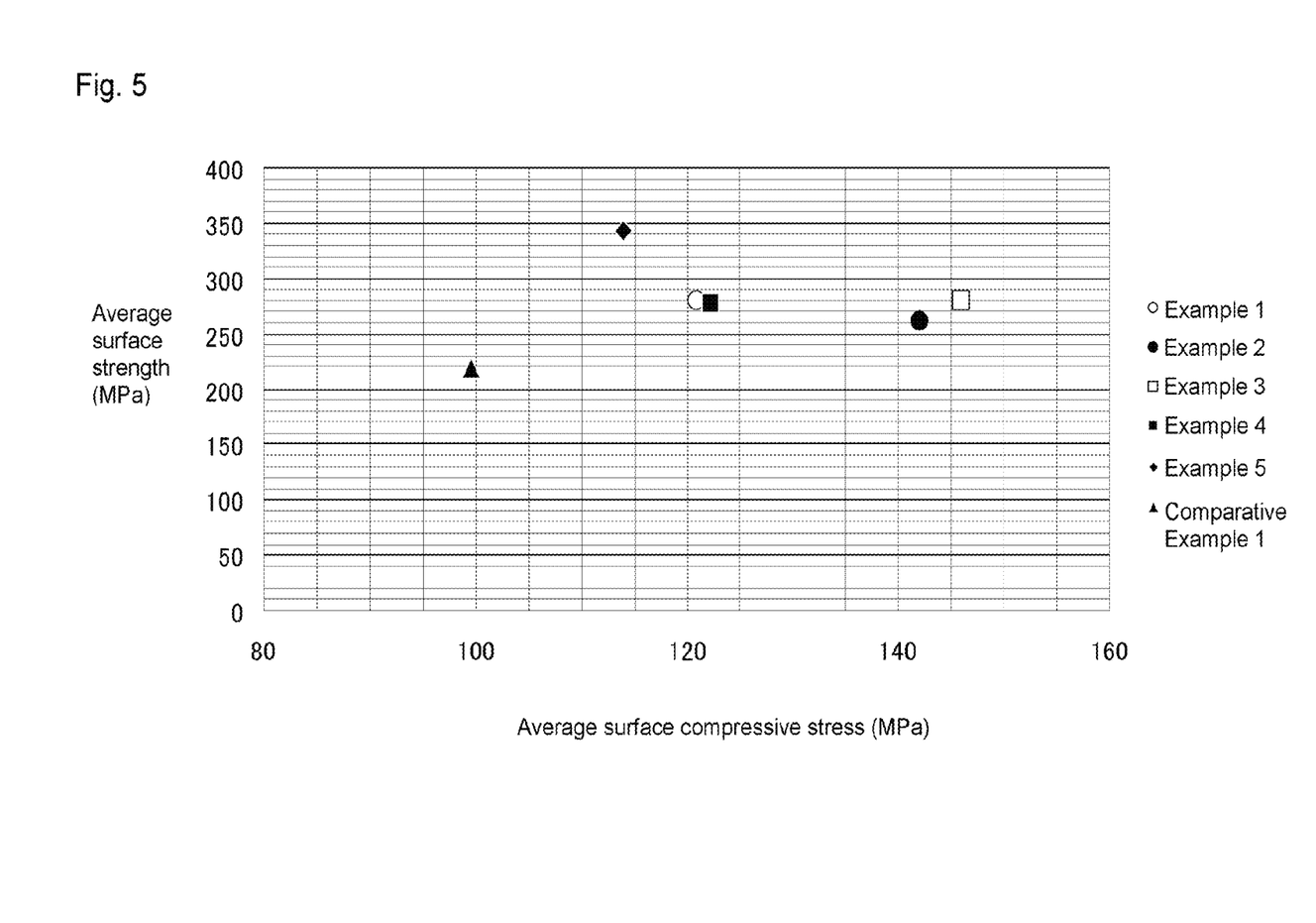
FIG. 5 is a graph obtained by plotting the results of ball drop tests.

FIG. 5 is a graph obtained by plotting the ball drop test results, wherein the ordinate represents the average surface strength (the average value of the surface strength) MPa, and the abscissa represents the average surface compressive stress (the average value of the surface compressive stress) MPa.

Here, in FIG. 5, it is shown that even if the average surface strength is from 220 to 400 MPa, a tempered glass sheet having an average surface compressive stress of less than 100 MPa does not satisfy the safety standard value for the fragmentation quality by the fragmentation test, although it satisfies the safety standard value for the surface strength by the ball drop test.

Further, in FIG. 5, it is shown that even if the average surface compressive stress is from 100 to 160 MPa, a tempered glass sheet having an average surface strength of less than 220 MPa does not satisfy the safety standard value for the impact strength quality by the ball drop test, although it satisfies the safety standard value for the number of fragments by the fragmentation test. Here, in FIG. 5, Example 1 is plotted with symbol ○; Example 2 is plotted with symbol ●; Example 3 is plotted with symbol □; Example 4 is plotted with symbol ■; the Example 5 is plotted with symbol ◆; and Comparative Example 1 is plotted with symbol ▲.

The fragmentation quality was satisfied by the average value of the surface compressive stress being within a range of at least 100 MPa, more preferably at least 105 MPa, further preferably at least 110 MPa.

Further, the impact strength quality was satisfied by the average value of the surface strength being within a range of at least 220 MPa, more preferably at least 230 MPa, further preferably at least 250 MPa.

Figure 6:
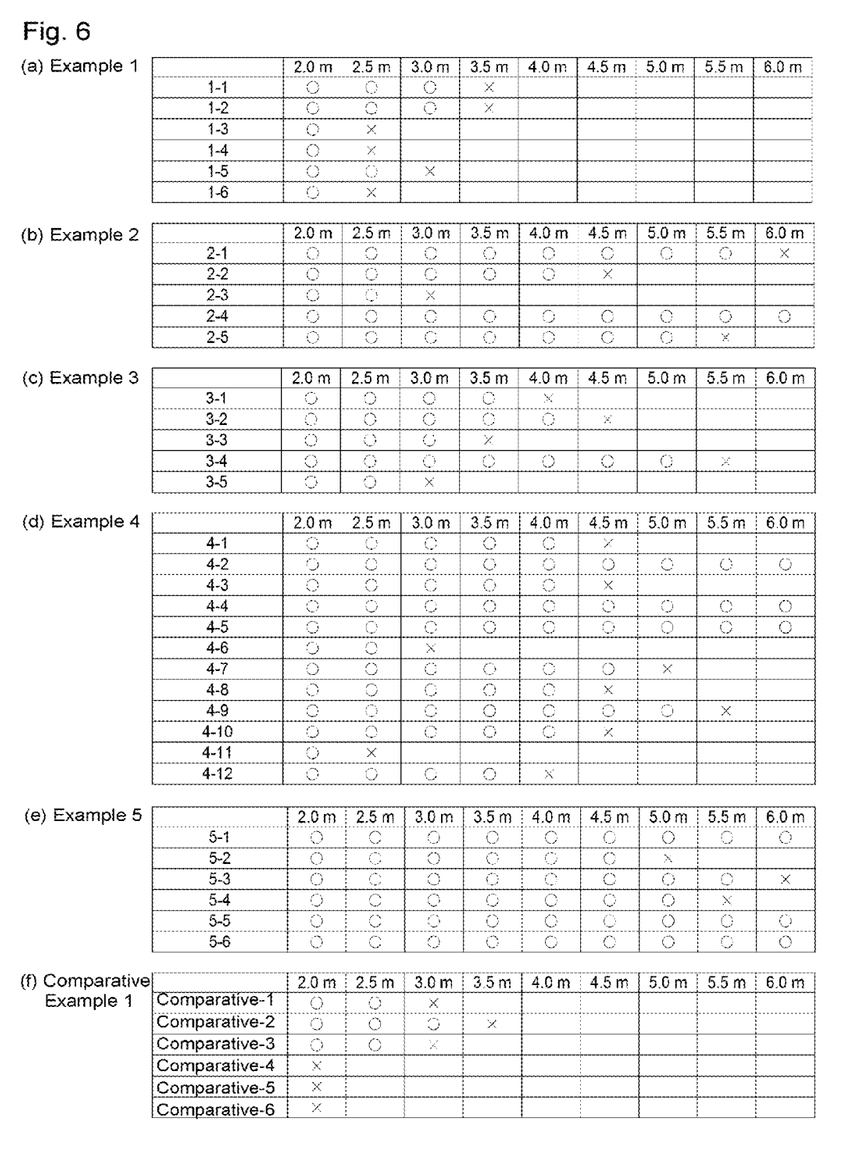
FIG. 6 is tables showing, in detail, the results of ball drop tests in Examples 1 to 5 and Comparative Example 1.

FIG. 6(a) is a table showing details of the ball drop test results with respect to six tempered glass sheets 1-1 to 1-6 in Example 1.

According to the table, all of six tempered glass sheets 1-1 to 1-6 satisfied a height of 2 m as the safety standard. Further, tempered glass sheets 1-1 and 1-2 satisfied a height of 3 m, and tempered glass sheet 1-5 satisfied a height of 2.5 m.

FIG. 6(b) is a table showing details of the ball drop test results with respect to five tempered glass sheets 2-1 to 2-5 which were not fractured in a ball drop test from a height of 2 m in Example 2.

According to the table, all of five tempered glass sheets 2-1 to 2-5 satisfied a height of 2 m as the safety standard. Further, tempered glass sheet 2-1 satisfied a height of 5.5 m; tempered glass sheet 2-2 satisfied a height of 4 m; tempered glass sheet 2-3 satisfied a height of 2.5 m; tempered glass sheet 2-4 satisfied a height of at least 6 m; and tempered glass sheet 2-5 satisfied a height of 5 m.

FIG. 6(c) is a table showing details of the ball drop test results with respect to five tempered glass sheets 3-1 to 3-5 which were not fractured in a ball drop test from a height of 2 m in Example 3.

According to the table, all of five tempered glass sheets 3-1 to 3-5 satisfied a height of 2 m as the safety standard. Further, tempered glass sheet 3-1 satisfied a height of 3.5 m; tempered glass sheet 3-2 satisfied a height of 4 m; tempered glass sheet 3-3 satisfied a height of 3 m; tempered glass sheet 3-4 satisfied a height of at least 5 m; and tempered glass sheet 3-5 satisfied a height of 2.5 m.

FIG. 6(d) is a table showing details of the ball drop test results with respect to twelve tempered glass sheets 4-1 to 4-12 in Example 4.

According to the table, all of twelve tempered glass sheets 4-1 to 4-12 satisfied a height of 2 m as the safety standard. Further, tempered glass sheet 4-1 satisfied a height of 4 m; tempered glass sheet 4-2 satisfied a height of at least 6 m; tempered glass sheet 4-3 satisfied a height of 4 m; tempered glass sheets 4-4 and 4-5 satisfied a height of at least 6 m; and tempered glass sheet 4-6 satisfied a height of 2.5 m. Further, tempered glass sheet 4-7 satisfied a height of 4.5 m; tempered glass sheet 4-8 satisfied a height of 4 m; tempered glass sheet 4-9 satisfied a height of 5 m; tempered glass sheet 4-10 satisfied a height of 4 m; tempered glass sheet 4-11 satisfied a height of 2 m; and tempered glass sheet 4-12 satisfied a height of 3.5 m.

FIG. 6(e) is a table showing details of the ball drop test results with respect to six tempered glass sheets 5-1 to 5-6 in Example 5.

According to the table, all of six tempered glass sheets 5-1 to 5-6 satisfied a height of 2 m as the safety standard. Further, tempered glass sheet 5-1 satisfied a height of at least 6 m; tempered glass sheet 5-2 satisfied a height of 4.5 m; tempered glass sheet 5-3 satisfied a height of 5.5 m; tempered glass sheets 5-4 satisfied a height of 5 m; and tempered glass sheet 5-5 and 5-6 satisfied a height of at least 6 m.

FIG. 6(f) is a table showing details of the ball drop test results with respect to six tempered glass sheets of comparative) to comparative 6 in Comparative Example 1.

According to the table, three sheets of comparative 1 to comparative 3 satisfied a height of 2 m as the safety standard, but with respect to three sheets of comparative 4 to 6, fracture occurred at a height of 2 m, whereby it was not possible to satisfy the safety standards.

Figure 7:
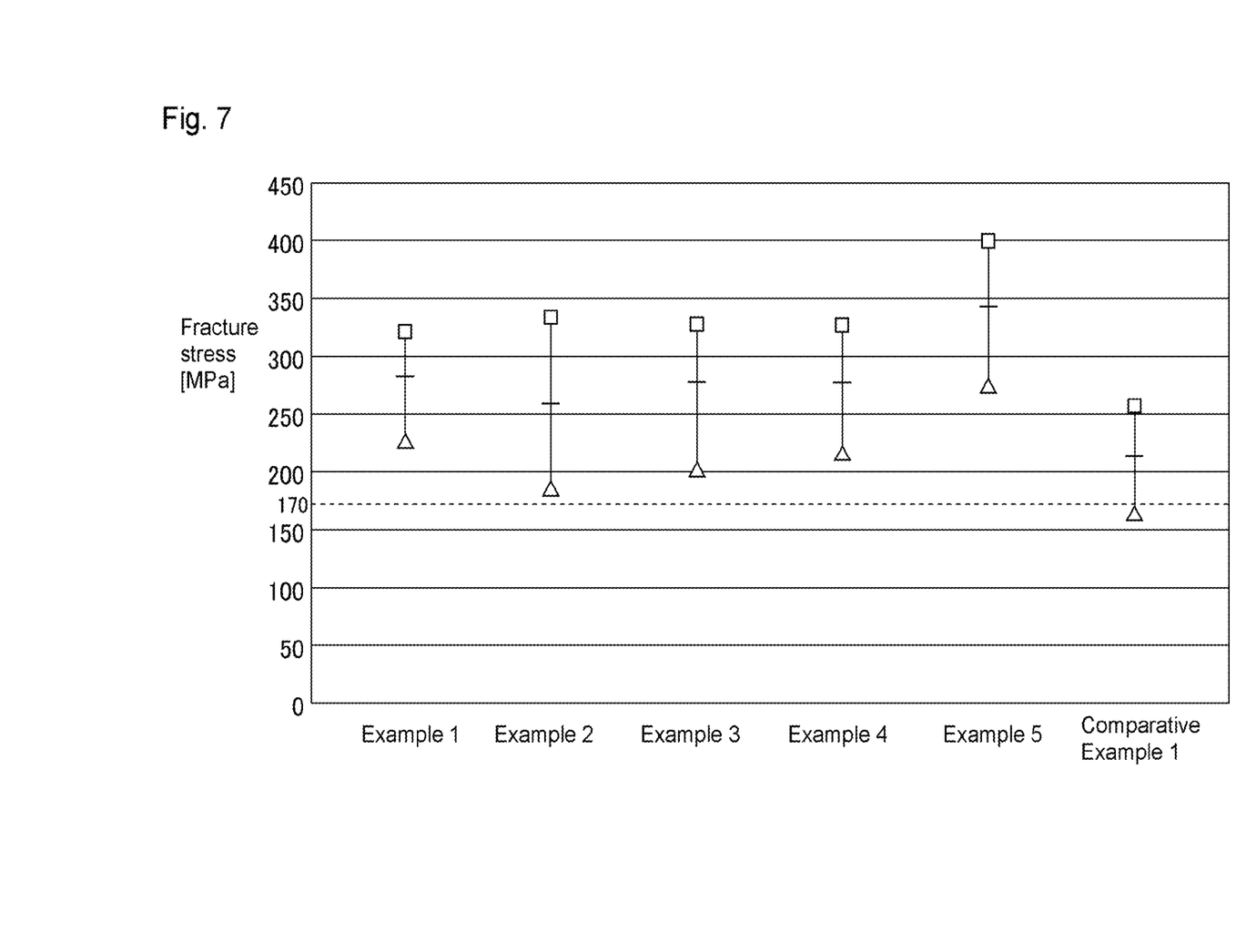
FIG. 7 is a graph wherein the maximum surface strength, the minimum surface strength and the average surface strength in Examples 1 to 5 and Comparative Example 1 are compared.

Further, FIG. 7 is a graph wherein the maximum surface strength, the minimum surface strength and the average surface strength in Examples 1 to 5 and Comparative Example 1, are compared. Here, the maximum surface strength is plotted with symbol □; the minimum surface strength is plotted with symbol Δ; and the average surface strength is plotted with symbol –.

According to the table, it is evident that in Comparative Example 1, the minimum surface strength was 168.3 MPa whereby it was not possible to secure the impact strength quality, while the minimum value in the surface strength of the tempered glass sheets of the present invention was at least 170 MPa, whereby it was possible to secure the impact strength quality.

The entire disclosure of Japanese Patent Application No. 2015-132348 filed on Jul. 1, 2015 including specification, claims, drawings and summary is incorporated herein by reference in its entirety.

REFERENCE SYMBOLS

G: glass sheet, G1: first surface, G2: second surface, G3: side surface, 10: air-quench tempering apparatus, 12: nozzle

What is claimed is:

1. An air-quenched tempered glass sheet having a first surface, a second surface opposed to the first surface and a side surface connecting the first and second surfaces, and having a thickness of from 1.8 to less than 2.5 mm,
   wherein the average value of the surface compressive stress at the first surface is within a range of from 100 to 160 MPa,
   the average value of the surface strength at the first surface is within a range of from 220 to 400 MPa,
   the Weibull distribution of the surface strength at the first surface is at least 7.5,
   the average value of the surface compressive stress at the second surface is at least the average value of the surface compressive stress at the first surface, and
   the average value of the surface strength at the second surface is at least the average value of the surface strength at the first surface.

2. The tempered glass sheet according to claim 1, wherein the average value of the surface compressive stress at the first surface is from 110 to 150 MPa.

3. The tempered glass sheet according to claim 1, wherein the Weibull distribution of the surface strength at the first surface is at least 8.0.

4. The tempered glass sheet according to claim 1, wherein a minimum value of the surface strength at the first surface is at least 170 MPa.

5. The tempered glass sheet according to claim 1, wherein a minimum value of the surface compressive stress at the first surface is at least 80 MPa.

6. The tempered glass sheet according to claim 1, wherein the thickness of the tempered glass sheet is from 1.8 to 2.3 mm.

7. The tempered glass sheet according to claim 1, wherein the average value of the surface compressive stress at the second surface is greater than the average value of the surface compressive stress at the first surface, and the average value of the surface strength at the second surface is greater than the average value of the surface strength at the first surface.

8. The tempered glass sheet according to claim 1, wherein the tempered glass sheet is suitable for a windowpane of an automobile.

9. The tempered glass sheet according to claim 1, wherein the Weibull distribution of the surface strength at the first surface is at least 8.5.

10. The tempered glass sheet according to claim 1, wherein the average value of the surface compressive stress at the first surface is within a range of from 105 to 155 MPa.

11. The tempered glass sheet according to claim 1, wherein the average value of the surface strength at the first surface is within a range of from 230 to 390 MPa.

12. The tempered glass sheet according to claim 1, wherein the average value of the surface strength at the first surface is within a range of from 250 to 380 MPa.

13. The tempered glass sheet according to claim 1, wherein a minimum value of the surface strength at the first surface is at least 180 MPa.

14. The tempered glass sheet according to claim 1, wherein a minimum value of the surface strength at the first surface is at least 190 MPa.

15. The tempered glass sheet according to claim 1, wherein a minimum value of the surface compressive stress at the first surface is at least 85 MPa.

16. The tempered glass sheet according to claim 1, wherein a minimum value of the surface compressive stress at the first surface is at least 90 MPa.

17. The tempered glass sheet according to claim 1, wherein a minimum value of the surface compressive stress at the first surface is at least 95 MPa.

18. The tempered glass sheet according to claim 2, wherein the Weibull distribution of the surface strength at the first surface is at least 8.0.

19. The tempered glass sheet according to claim 2, wherein the thickness of the tempered glass sheet is from 1.8 to 2.3 mm.

20. The tempered glass sheet according to claim 2, wherein the average value of the surface compressive stress at the second surface is greater than the average value of the surface compressive stress at the first surface, and the average value of the surface strength at the second surface is greater than the average value of the surface strength at the first surface.

\* \* \* \* \*